United States Patent Office 3,157,636
Patented Nov. 17, 1964

3,157,636
METHOD FOR PURIFICATION OF 5'-PURINE-NUCLEOTIDES
Yasushi Sanno, Osaka, Kiyoshi Nara, Nishinomiya, Sinpei Minato, Ashiya, and Yutaka Hirose, Nishinomiya, Japan, assignors to Takeda Chemical Industries, Ltd., Osaka, Japan
No Drawing. Filed Aug. 10, 1961, Ser. No. 130,474
16 Claims. (Cl. 260—211.5)

This invention relates to a method for purifying 5'-nucleotides, and more concretely, a process for separating disodium salts of 5'-purine-mononucleotides from those of the 5'-mononucleotide mixture obtained by enzymatic hydrolysis of nucleic acids.

In this specification, the term "5-purine-nucleotide" is defined as 5'-mononucleotide having a purine base in its structure, such as 5'-inosinic acid, 5'-guanylic acid, etc., and the term "5'-pyrimidine-nucleotide" as 5'-mononucleotide having a pyrimidine base in its structure, such as 5'-cytidylic, 5'uridylic acid, etc.

Because of the good taste, pleasing flavor and non-toxicity of the 5'-mononucleotides, the industrial production of the latter is currently directed to the provision thereof for use as excellent chemical condiments.

However, it has been found that in point of fact the good taste of the 5'-mononucleotides is ascrible to 5'-inosinic acid and 5'-guanylic acid, i.e. 5'-purine-nucleotides, while 5'-cytidylic acid, 5'-uridylic acid, etc. belonging to the 5'-pyrimidine-nucleotides, do not exhibit any good taste by themselves but play the role of strengthening the taste of the 5'-purine-nucleotides when a small quantity of the former is admixed with the latter.

For the separation of the respective 5'-mononucleotides from a mixture thereof, column chromatography through ion exchange resin, such as a strongly basic resin or a strongly acidic resin, has generally been employed, for example, in the following manner: the 5'-nucleotides are adsorbed onto the resin and eluted with appropriate solvents.

Although it is possible by the said method to fractionate a mixture of 5'-mononucleotides into the respective components of the mixture, it is quite difficult to adapt the said method for the industrial production of 5'-mononucleotides, because said method necessitates an enormous amount of the resin and the solvent for the elution and requires a long time for fully eluting out the 5'mononucleotides adsorbed on the resin. In the said method, the resin has to be used in an amount at least 10 to 100 times as much as that of the 5'-mononucleotides to be treated, so that, even for working up only 100 kilograms of 5'-mononucleotides by the said method, a number of towers or a huge tower which is packed with at least 1 to 10 tons of resin is necessary; besides, the time required for adsorption and elution of the 5'-mononucelotides is about a week on such a scale. These are the reasons which have made it difficult to obtain 5'-mononucleotides at a low cost in this manner.

It has now been found, as mentioned above, that it is needless for the production of condiments to fractionate a mixture of 5'-mononucleotides into the respective ones as hitherto-effected, it being sufficient for the purpose in view to separate only the 5'-purine-nucleotides having good taste from the 5'-mononucleotide mixture; nor is it necessary that the 5'-purine-nucleotides be fully purified to remove the pyrimidine-nucleotides.

In addition, a striking aspect of the present invention is that there is a distinct difference between the disodium salts of the 5'-purine-nucleotides and those of the 5'-pyrimidine-nucleotides as regards their solubilities in a mixture of water and a hydrophilic organic solvent, such as methanol, ethanol, n-propanol, acetone, etc. Thus, although both the disodium salts of the 5'-purine-nucleotides and those of the 5'-pyrimidine-nucleotides are quite easily soluble in water and both are insoluble in an organic solvent, such as those mentioned above, they show quite different a behavior in a mixture of water and such organic solvent in an appropriate ratio. The present invention has successfully been based upon the afore-mentioned interesting findings.

Hence, it is a primary object of the present invention to produce easily and at low cost 5'-purine-nucleotides which are useful especially as chemical condiments, by removing 5'-pyrimidine-nucleotides, which are not so useful for the good taste of 5'-mononucleotides.

Another object of the present invention is to provide a means by which the scaling up of the production of the desired 5'-mononucleotides is made possible and the means suitably employed in an industrial production of said substances.

A further object is to decrease the necessary amount of resin, and the long period of time required for the hitherto-employed method using ion-exchange resin, even where it is desired to fractionate 5'-mononucleotides into the respective components.

The mixture of 5'-mononucleotides to be subjected to the method of the present invention is obtainable by hydrolying nucleic acids or their partial hydrolyzates with an enzyme-system produced by a microorganism capable of producing a nucleic acid hydrolyzing enzyme system, which is distributed among a considerably wide variety of microorganisms, such as *Streptomyces griseus, Streptomyces flavus, Streptomyces aureus, Streptomyces lavendulae, Fusarium roseum, Helminthosporium sigmoideum, Bacillus brevis, Bacillus subtilis, Anixiella reticulispora, Aspergillus elegans, Aspergillus flavipes, Botryosphaeria ribis chromogena, Chaetomidium japonicum, Glomerella cinqualata, Neurospora crassa, Neurospora sitophila, Ophiobolus miyabeanus, Ophiostoma ulmi, Sordaria fimicola, Tilachlidium humicola*, etc.

The enzyme system may be employed for the said purpose as living micro-organism or as extracted enzyme solution or as cell- or mycelium-suspension or the like. More concretely, the microorganism may be incubated on a medium containing yeast extract as well as other nutrient sources, or the culture filtrate of the microorganism is brought into contact with the yeast extract, or a cell- or mycelium-suspension of the microorganism is brought into contact with the nucleic acids or their partial hydrolyzates. In all cases, the incubation of the microorganism may be conducted at about 20° to 40° C. for 2 to 5 days. Sometimes the enzyme system is contaminated with phosphomonoesterase capable of hydrolyzing 5'-mononucleotides into the corresponding nucleosides which have no taste. In such a case, a phosphomonoesterase-inhibitor, such as a phosphate, fluoride, arsenate, etc., or a phenol compound, such as phenol, cresol, etc., may be added to the reaction system, or the enzyme system may be subjected to heat treatment so that the phosphomonoesterase may be inactivated.

The 5'-mononucleotide mixture thus obtained contains 5'-inosinic acid, 5'-guanylic acid, 5'-uridylic acid and 5'-cytidylic acid in approximately equal amounts. Natural nucleic acids do not contain 5'-inosinic acid but have 5'-adenylic acid as a component. However, 5'-adenylic acid in the natural nucleic acids is changed into 5'-inosinic acid by deamination caused by the action of so-called adenylic acid deaminase in the employed enzyme system simultaneously with the hydrolysis of the nucleic acid into 5'-mononucleotides. If adenylic acid deaminase is absent in the employed enzyme system, 5'-adenylic acid may be accumulated in the hydrolyzate instead of 5'- inosinic acid. However, as the essence of the good taste is not 5′-adenylic acid but 5′-inosinic acid, the accumulated 5′-adenylic acid may be deaminated after or prior to the separation, for example, by means of diazotization with a nitrite and subsequent hydrolysis of the diazonium salts. If deamination through diazotization is effected, 5′-guanylic acid is also deaminated to change it into 5′-xanthylic acid which has never been found in natural nucleic acid. However, 5′-xanthylic acid also has a fairly good taste and is usable as condiment for improving or enhancing the taste or flavor of foodstuffs or beverages.

Thus, in the mixture of 5′-mononucleotides, there are contained 5′-purine-nucleotides consisting of 5′-inosinic acid (or 5′-adenylic acid) and 5′-guanylic acid (or 5′-xanthylic acid), and 5′-pyrimidine-nucleotides, such as 5′-cytidylic acid, 5′-uridylic acid, etc. The mixture of 5′-mononucleotides obtained by the hydrolysis of nucleic acid or partial hydrolyzates may be subjected to a column employing ion-exchange resin or active carbon, or electrodialysis using ion-exchange membranes to eliminate impurities to some extent or completely. The purified aqueous solution is concentrated, if necessary, to make its quantity about 4 to 10 times as much as the 5′-mononucleotides, and neutralized with sodium hydroxide to allow the 5′-mononucleotides to form the corresponding disodium salts. To the resulting aqueous solution is added a hydrophilic organic solvent, such as methanol, ethanol, n-propanol, acetone, etc., to separate out crystals or crystalline powder of 5′-purine-nucleotides in the solution. The quantity of the organic solvent to be added varies depending on the kind of solvent and the desired purity of the resulting crystals.

Several results of typical runs are shown below. Each run employed 50 cubic centimeters of 5′-mononucleotide disodium salt solution which had been obtained by hydrolyzing yeast ribonucleic acid with the enzyme-system of *Streptomyces aureus* and which contained 1.72 grams of disodium 5′-inosinate, 1.40 grams of disodium 5′-guanylate, 1.30 grams of disodium 5′-uridylate and 1.72 grams of disodium 5′-cytidylate. The organic solvent was added to the aqueous solution at 25° C. to make the concentration as indicated, whereupon a mixture of crystals was precipitated. The crystals were collected by filtration and analyzed to obtain the below-listed data.

TABLE I

| Organic Solvent | Concentration of organic solvent (v./v.) (percent) | Amount of disodium salts of 5′-mononucleotides crystallized out of the solution | | | |
|---|---|---|---|---|---|
| | | Disodium 5′-inosinate (grams) | Disodium 5′-guanylate (grams) | Disodium 5′-uridylate (grams) | Disodium 5′-cytidylate (grams) |
| | 0 | 0.00 | 0.00 | 0.00 | 0.00 |
| Methanol | 30 | 0.21 | 0.15 | 0.00 | 0.00 |
| | 40 | 0.80 | 0.75 | 0.00 | 0.00 |
| | 50 | 1.33 | 1.21 | 0.21 | 0.34 |
| | 66 | 1.63 | 1.31 | 0.63 | 0.75 |
| Ethanol | 30 | 0.92 | 0.88 | 0.00 | 0.05 |
| | 40 | 1.35 | 1.27 | 0.26 | 0.24 |
| | 50 | 1.43 | 1.32 | 0.36 | 0.32 |
| | 66 | 1.65 | 1.32 | 0.85 | 0.92 |
| Acetone | 30 | 0.73 | 0.69 | 0.07 | 0.08 |
| | 40 | 1.12 | 1.11 | 0.18 | 0.33 |
| | 50 | 1.20 | 1.30 | 0.41 | 0.45 |
| | 66 | 1.59 | 1.35 | 0.69 | 0.54 |
| n-Propanol | 30 | 0.64 | 0.44 | 0.07 | 0.08 |

As shown in the preceding table, it is possible, through one simple course, to separate crystals of 5′-purine-nucleotides, not containing 5′-pyrimidine-nucleotides. However, it may be wise not to attempt to obtain a pure 5′-purine-nucleotides through only one simple course, because a considerable amount of 5′-purine-nucleotides necessarily remains in the mother liquor. Practically, rather high concentrations of organic solvents are usable, which are as follows:

| Organic solvent | Practically usable concentration of organic solvent, percent (v./v.) | The most desirable concentration of organic solvent, percent (v./v.) |
|---|---|---|
| Methanol | 30–65 | Around 50. |
| Ethanol | 30–50 | Around 40. |
| n-Propanol | 25–45 | Around 35. |
| Acetone | 30–50 | Around 40. |

If it be desired to remove a small amount of 5′-pyrimidine-nucleotides which may be contaminating the resulting crystals, the same procedure as above is repeated.

The present invention may be carried out as follows. A mixture of disodium salts of 5′-mononucleotides is dissolved in about 8 to 20 times the quantity by weight of a mixture of water and a hydrophilic organic solvent, such as methanol, ethanol, n-propanol, acetone, etc., while heating. The ratio of the organic solvent and water to be mixed may be determined on the same basis as the final ratio of the solvent system in the above-mentioned means of fractional precipitation. The hot solution is then gradually cooled, with agitation if desired, to precipitate the crystals of disodium salts of 5′-purine-nucleotides.

The following examples are illustrative of presently preferred embodiments of the present invention, but they are not intended to limit the scope of this invention. In the examples, the temperatures are all uncorrected, and the percentages are in weight per cent unless otherwise noted. The relationship between parts by weight and parts by volume, in the examples and in the claims, is the same as that between kilograms and liters.

*Example 1*

Yeast RNA is hydrolyzed, as previously described, by the action of the enzyme solution obtained by cultivating *Streptomyces aureus* (Krainsky emend. Waksman et al.) Waksman et al., whereupon a mixture of 5′-mononucleotides is produced in the reaction mixture. In the presence of filter aid, for example, Hyflo Super-Cel, 35,000 parts by volume of the resulting mixture containing 5′-mononucleotides is filtered. After being adjusted to pH 1.5, the filtrate is allowed to flow onto a tower packed with 500 parts by weight of active carbon. The active carbon with adsorbed 5′-mononucleotides in the tower is washed with water, and then eluted with 20,000 parts by volume of ammoniacal 20% methanol-water. The eluate is concentrated to make the volume 10,000 parts and the concentrated solution is allowed to flow onto a tower packed with 6,000 parts by volume of "Amberlite IRA–400 (Cl-type)" (Rohm & Haas Co., U.S.A.) to adsorb the 5′-mononucleotides on the resin, which are then eluted out with 0.2% aqueous hydrochloric acid. To eliminate the hydrochloric acid in the eluate, the eluate is allowed to flow through a tower packed with 200 parts by weight of active carbon. The active carbon and adsorbed 5′-mononucleotides in the tower are washed with water, and then eluted with 10,000 parts by volume of ammoniacal 20% methanol-water. The resulting eluate contains 5′-purine-nucleotides and 5′-pyrimidine-nucleotides.

To the solution is added sodium hydroxide solution so that the 5′-mononucleotides may change into the corresponding disodium salts, then the mixture is concentrated under reduced pressure to make its volume 500 parts by volume, in which about 50 parts by weight each of 5′-purine-nucleotides and 5′-pyrimidine-nucleotides are contained. To the concentrate is added an equal volume of methanol. The mixture is warmed to dissolve the substances precipitating therein, and then the solution is allowed to stand with mild stirring for 25 hours in a cool room to precipitate white crystals. The crystals are collected by filtration and dried at 50° C. under reduced pressure to give 59.3 parts by weight of the product.

The product is a mixture of 46.0 parts by weight of disodium salts of 5'-purine-nucleotides and 1.5 parts by weight of disodium salts of 5'-pyrimidine-nucleotides.

*Example 2*

In a similar manner to Example 1, RNA extract was treated with an enzyme system produced by *Streptomyces aureus* (Krainsky emend. Waksman et al.) Waksman et al. to give a 5'-mononucleotides mixture, and the mixture is somewhat purified to obtain a solution containing 5'-purine-nucleotides and 5'-pyrimidine-nucleotides. The solution is neutralized to change the 5'-mononucleotides into the corresponding disodium salts, and is then concentrated to make its volume 400 parts by volume, in which about 50 parts by weight each of disodium salts of 5'-purine-nucleotides and those of 5'-pyrimidine-nucleotides are contained. To the concentrate is added 400 parts by volume of methanol. The mixture is warmed to dissolve the precipitated crystals, and is allowed to cool gradually. After 24 hours cooling, the mixture is filtered to collect the precipitated white crystals. The crystals are dried at 50° C. under reduced pressure to obtain 71.8 parts by weight of the product.

The product contains 47.5 parts by weight of disodium salts of 5'-purine-nucleotides and 10.0 parts by weight of disodium salts of 5'-pyrimidine-nucleotides.

*Example 3*

To 500 parts by volume of an aqueous solution containing 50 parts by weight each of disodium salts of 5'-purine-nucleotides and disodium salts of 5'-pyrimidine-nucleotides are added 500 parts by volume of methanol. The mixture is warmed to dissolve the crystallized substances, and is allowed to cool, then further 500 parts by volume of methanol are gradually added to the mixture. The whole mixture is filtered to collect the precipitated colorless crystals which contain 48.0 parts by weight of disodium salts of 5'-purine-nucleotides and 25.0 parts by weight of disodium salts of 5'-pyrimidine-nucleotides.

*Example 4*

Through a tower packed with 4,250 parts by volume of "Amberlite IRA-402" (Robin & Haas Co., U.S.A.), there are allowed to flow 100,000 parts by volume of yeast RNA hydrolyzate which contains 56.6 parts by weight of 5'-inosinic acid, 49.0 parts by weight of 5'-guanylic acid, 57.3 parts by weight of 5'-uridylic acid and 45.3 parts by weight of 5'-cytidylic acid, whereupon the 5'-mononucleotides are adsorbed on the resin. The resin is eluted with aqueous 0.2 N-hydrochloric acid. The eluate is brought into contact with 850 parts by weight of active carbon, and the carbon is eluted with 1.5% aqueous solution of ammonia to obtain a purified aqueous solution of 5'-mononucleotides. To the solution is added 10N-sodium hydroxide solution so that the 5'-mononucleotides may change into the corresponding disodium salts, and the solution is concentrated to make its volume about 660 parts. In the concentrate there are 45.1 parts of disodium 5'-inosinate, 39.2 parts of disodium 5'-guanylate, 45.1 parts of disodium 5'-uridylate and 36.5 parts of disodium 5'-cytidylate, respectively by weight. To the concentrated solution are added 660 parts by volume of methanol to precipitate crystals, which consist of 36.0 parts of disodium 5'-inosinate, 33.2 parts of disodium 5'-guanylate, 6.4 parts of disodium 5'-uridylate and 7.3 parts of disodium 5'-cytidylate.

The resulting mixture of crystals is dissolved in 350 parts by volume of water and to the aqueous solution are added 350 parts by volume of methanol to precipitate crystals consisting of 25.3 parts by weight of disodium 5'-inosinate and 23.9 parts by weight of disodium 5'-guanylate.

*Example 5*

To 50 parts by volume of an aqueous solution containing 3.10 parts by weight of disodium salts of 5'-purine-nucleotides and 3.00 parts by weight of disodium salts of 5'-pyrimidine-nucleotides, there are added 50 parts by volume of methanol and the mixture is allowed to stand overnight at 25° C. to precipitate crystals. The crystals are collected by filtration and dried to give 2.75 parts by weight of mixed crystals, which consist of 2.06 parts by weight of disodium salts of 5'-purine-nucleotides, a barely detectable amount of disodium salts of 5'-pyrimidine-nucleotides and about 0.6 part by weight of water. The yield of disodium salts of 5'-purine-nucleotides is 66.6%.

*Example 6*

To 50 parts by volume of an aqueous solution containing 3.10 parts by weight of disodium salts of 5'-purine-nucleotides and 3.00 parts by weight of disodium salts of 5'-pyrimidine-nucleotides, there are added 33 parts by volume of ethanol and the mixture is allowed to stand overnight at 25° C. to precipitate crystals. The crystals are collected by filtration and dried under reduced pressure to give 2.45 parts by weight of mixed crystals, which consist of 2.02 parts by weight of disodium salts of 5'-purine-nucleotides, a barely detectable amount of disodium salts of 5'-pyrimidine-nucleotides and about 0.4 part by weight of water. The yield of disodium salts of 5'-purine-nucleotides is 65.5%.

*Example 7*

To 50 parts by volume of an aqueous solution containing 3.10 parts by weight of disodium salts of 5'-purine-nucleotides and 3.00 parts by weight of those of 5'-pyrimidine-nucleotides, there are added 30 parts by volume of acetone and the mixture is allowed to stand overnight at 25° C. to precipitate crystals. The crystals are collected by filtration and dried under reduced pressure to obtain 1.65 parts by weight of crystalline powder, which consist of 1.36 parts by weight of disodium salts of 5'-purine-nucleotides, a barely detectable amount of disodium salts of 5'-pyrimidine-nucleotides and about 0.25 parts by weight of water. The yield of the 5'-purine-nucleotides salts is 44.0%.

Having thus disclosed the invention, what we claim is:

1. A method for separating 5'-purine-nucleotides selected from the group consisting of 5'-inosinic acid and 5'-guanylic acid from 5'-mononucleotide mixture obtained by hydrolyzing nucleic acid, which comprises crystallizing disodium salts of said 5'-mononucleotide mixture from a mixed solvent system consisting of water and a hydrophilic organic solvent selected from the group consisting of methanol, ethanol, n-propanol and acetone, whereupon a mixture substantially consisting of the disodium salts of said 5'-purine-nucleotides is separated.

2. A method for separating 5'-purine-nucleotides selected from the group consisting of 5'-inosinic acid and 5'-guanylic acid as a mixture consisting of 5'-inosinic acid and 5'- guanylic acid from 5'-mononucleotide mixture obtained by hydrolyzing nucleic acid, which comprises preparing an aqueous solution of disodium salts of said 5'-mononucleotide mixture, and adding to the aqueous solution a hydrophilic organic solvent selected from the group consisting of methanol, ethanol, n-propanol and acetone, whereupon a mixture substantially consisting of the disodium salts of said 5'-purine-nucleotides is separated.

3. The method as claimed in claim 2, wherein the preparation of the aqueous solution is effected by concentrating a diluted solution of disodium salts of the 5'-mononucleotide mixture.

4. The method as claimed in claim 2, wherein the preparation of the aqueous solution is effected by dissolving disodium salts of the 5'-mononucleotide mixture.

5. A method for separating 5'-purine-nucleotides selected from the group consisting of 5'-inosinic acid and 5'-guanylic acid as a mixture consisting of 5'-inosinic acid and 5'-guanylic acid from 5'-mononucleotide mixture obtained by hydrolyzing nucleic acid, which comprises dissolving disodium salts of said 5'-mononucleotide mixture by heating in a mixed solvent system consisting of water and a hydrophilic organic solvent selected from the group consisting of methanol, ethanol, n-propanol and acetone, and cooling the hot solution, whereupon a mixture substantially consisting of the disodium salts of said 5'-purine-nucleotides is separated.

6. A method for separating 5'-purine-nucleotides selected from the group consisting of 5'-inosinic acid and 5'-guanylic acid as a mixture consisting of 5'-inosinic acid and 5'-guanylic acid from 5'-mononucleotide mixture obtained by hydrolyzing nucleic acid, which comprises crystallizing one part by weight of disodium salts of said 5'-mononucleotide mixture from a mixed solvent system consisting of from 4 to 10 parts by volume of water and a hydrophilic organic solvent selected from the group consisting of methanol, ethanol, n-propanol and acetone, the volume thereof being from one third to twice as much as that of water, whereupon a mixture substantially consisting of the disodium salts of said 5'-purine-nucleotides is separated.

7. A method for separating 5'-purine-nucleotides selected from the group consisting of 5'-inosinic acid and 5-guanylic acid as a mixture consisting of 5'-inosinic acid and 5'-guanylic acid from 5'-mononucleotide mixture obtained by hydrolyzing nucleic acid, which comprises preparing a solution of one part by weight of disodium salts of said 5'-mononucleotide mixture in from 4 to 10 parts by volume of water, and adding to the aqueous solution a hydrophilic organic solvent selected from the group consisting of methanol, ethanol, n-propanol and acetone, the volume thereof being from one third to twice as much as that of the water, whereupon a mixture substantially consisting of the disodium salts of said 5'-purine-nucleotides is separated.

8. The method as claimed in claim 7, wherein the preparation of the aqueous solution is effected by concentrating a diluted solution of disodium salts of the 5'-mononucleotide mixture.

9. The method as claimed in claim 7, wherein the preparation of the aqueous solution is effected by dissolving disodium salts of the 5'-mononucleotide mixture.

10. A method for separating 5'-purine-nucleotides selected from the group consisting of 5'-inosinic acid and 5'-guanylic acid as a mixture consisting of 5'-inosinic acid and 5'-guanylic acid from 5'-mononucleotide mixture obtained by hydrolyzing nucleic acid, which comprises dissolving one part by weight of disodium salts of said 5'-mononucleotide mixture while heating in a mixed solvent system consisting of from 4 to 10 parts by volume of water and a hydrophilic organic solvent selected from the group consisting of methanol, ethanol, n-propanol and acetone, the volume thereof being from one third to twice as much as that of the water, and cooling the hot solution below the saturation temperature of the disodium salts of the 5'-purine-nucleotides, whereupon a mixture substantially consisting of the disodium salts of said 5'-purine-nucleotides is separated.

11. A method for separating 5'-purine-nucleotides selected from the group consisting of 5'-inosinic acid and 5-guanylic acid as a mixture consisting of 5'-inosinic acid and 5'-guanylic acid from 5'-mononucleotide mixture obtained by hydrolyzing nucleic acid, which comprises preparing a solution of one part by weight of disodium salts of said 5'-mononucleotide mixture in from 4 to 10 parts by volume of water, and adding to the aqueous solution from half to twice as much methanol as the amount of the water, whereupon a mixture substantially consisting of the disodium salts of said 5'-purine-nucleotides precipitates.

12. The method as claimed in claim 11, wherein the preparation of the aqueous solution is effected by concentrating a diluted solution of disodium salts of the 5'-mononucleotide mixture.

13. The method as claimed in claim 11, wherein the preparation of the aqueous solution is effected by dissolving disodium salts of the 5'-mononucleotide mixture.

14. A method for separating 5'-purine-nucleotides selected from the group consisting of 5'-inosinic acid and 5-guanylic acid as a mixture consisting of 5'-inosinic acid and 5'-guanylic acid from 5'-mononucleotide mixture obtained by hydrolyzing nucleic acid, which comprises dissolving one part by weight of disodium salts of said 5'-mononucleotide mixture while heating in a mixed solvent system consisting of from 4 to 10 parts by volume of water and from half to twice as much methanol as the number of parts by volume of the water, and cooling the hot solution below its saturation point, whereupon a mixture substantially consisting of the disodium salts of said 5'-purine-nucleotides is separated.

15. A method for separating 5'-purine-nucleotides selected from the group consisting of 5'-inosinic acid and 5'-guanylic acid as a mixture consisting of 5'-inosinic acid and 5'-guanylic acid from 5'-mononucleotide mixture obtained by hydrolyzing nucleic acid, which comprises submitting one part by weight of disodium salts of said 5'-mononucleotide mixture to recrystallization from a mixed solvent system consisting of from 4 to 10 parts by volume of water and about an equal volume of methanol to precipitate a mixture substantially consisting of the disodium salts of the 5'-purine-nucleotides, separating the precipitated mixture from its mother liquor and subjecting said mixture thus separated to the same treatment as above repeatedly, whereupon a mixture of the disodium salts of said 5'-purine-nucleotides is produced.

16. A method which comprises forming a system, the system consisting essentially of from one tenth to one quarter part by weight of a disodium 5'-mononucleotide mixture in admixture with a mixed solvent at ambient temperature, whereby disodium 5'-purine-nucleotides selected from the group consisting of 5'-inosinic acid and 5'-guanylic acid precipitate and are thus separated from disodium 5'-pyrimidine-nucleotide, the disodium 5'-mononucleotide mixture consisting essentially of said disodium 5'-purine-nucleotides and disodium 5'-pyrimidine-nucleotide, the mixed solvent consisting of one part by volume of water and from one third to two parts by volume of a hydrophilic organic solvent selected from the group consisting of methanol, ethanol, n-propanol and acetone, the relationship between parts by weight and parts by volume being the same as that between kilograms and liters.

References Cited in the file of this patent
UNITED STATES PATENTS
2,700,038    Lipton _____ Jan. 18, 1955